United States Patent [19]

Barclay et al.

[11] Patent Number: 4,755,842
[45] Date of Patent: Jul. 5, 1988

[54] APPARATUS FOR INITIALIZING A FRAME COUNTER FROM A RANDOM SETTING

[75] Inventors: David Barclay; Lee D. Oldfield, both of Rochester, N.Y.

[73] Assignee: Eastman Kodak Company, Rochester, N.Y.

[21] Appl. No.: 141,434

[22] Filed: Jan. 6, 1988

[51] Int. Cl.⁴ .............................................. G03B 17/36
[52] U.S. Cl. ..................................... 354/217; 354/214
[58] Field of Search ............. 354/214, 215, 217, 173.1

[56] References Cited

U.S. PATENT DOCUMENTS

| | | | |
|---|---|---|---|
| 2,629,563 | 2/1953 | Kesel et al. | 242/71 |
| 3,136,291 | 6/1964 | Irisawa et al. | 354/215 |
| 3,892,354 | 7/1975 | Nagao et al. | 354/215 |
| 4,540,261 | 9/1985 | Matsumoto et al. | 354/173.11 |
| 4,610,522 | 9/1986 | Tobioka et al. | 354/173.1 |
| 4,676,621 | 6/1987 | Desormeaux | 354/217 |
| 4,707,096 | 11/1987 | Lawther | 354/217 |

FOREIGN PATENT DOCUMENTS 8255614 4/1977 Japan .

Primary Examiner—A. A. Mathews
Attorney, Agent, or Firm—Roger A. Fields

[57] ABSTRACT

Each time an actuator is rotated in engagement with respective teeth of a frame counter in a disposable camera, the counter is rotated the equivalent of one frame to its next setting. To initialize the counter from a random setting during factory prewinding of an unexposed filmstrip onto a take-up spool, the counter includes an elongate rise located between two of its teeth. When the counter is rotated sufficiently in a prewinding direction to locate the elongate rise immediately ahead of the actuator, the counter is initialized. Since the actuator cannot surmount the elongate rise, continued rotation of the actuator in a prewinding direction will not rotate the counter to another setting. Thus as the filmstrip continues to be factory prewound onto the take-up spool the counter remains initialized.

3 Claims, 4 Drawing Sheets

APPARATUS FOR INITIALIZING A FRAME COUNTER FROM A RANDOM SETTING

CROSS-REFERENCE TO A RELATED APPLICATION

Reference is made to commonly assigned, copending U.S. application Ser. No. 141,166, filed Jan. 6, 1988 in the name of David Barclay and entitled METHOD OF INITIALIZING A FRAME COUNTER.

BACKGROUND OF THE INVENTION

1. Field of the Invention

The invention relates generally to the field of photography, and more particularly to apparatus for initializing a frame or exposure counter in a camera to a preliminary setting.

2. Description of the Prior Art

A frame or exposure counter is a measuring mechanism built into certain cameras to indicate to the user the actual member of individual frames of the filmstrip exposed or remaining to be exposed. Typically, the frame counter comprises a counter dial having thirty-six evenly spaced numbered settings designated by the numbers "1, 2, 3, 4, 5 . . . 36" imprinted on the dial at corresponding locations and a preliminary setting designated by a mark or a letter imprinted on the dial at a predetermined location spaced from the "1" by the equivalent of one or two of the numbered settings. The numbers "1"–"36" indicate successive frames of the filmstrip and the mark or letter corresponds to a limited section of the filmstrip, preceding the first frame, which is exposed preparatory to taking the first picture. Often, it is advised to take one or two blank exposures (with the lens covered) before taking the first picture, to ensure that the filmstrip is properly threaded onto a take-up spool in the camera. Thus after taking the blank exposure(s) the counter dial will have been incremented from its preliminary setting to its "1" setting.

Recently a disposable single-use camera referred to as the "Quick Snap" was introduced by Fuji Photo Film Co. Ltd. At the manufacturer, the camera is loaded with a conventional 24-exposure 35 mm film cartridge and substantially the entire length of the unexposed filmstrip is factory prewound from the cartridge onto a take-up spool. A metering sprocket in engagement with the unexposed filmstrip is rotated during the prewinding operation to rotate an actuator in engagement with respective teeth of a counter dial to, in turn, increment the counter dial from its "1" setting to an "S" setting, following the "24" setting. This is done to initialize the frame counter to the "S" setting. Then, one or two blank exposures are taken, and the counter dial is returned to its "24" setting.

After you take a picture using the "Quick Snap", a thumbwheel engaging a film spool in the cartridge is manually rotated to rewind the exposure into the cartridge. The rewinding movement of the filmstrip the equivalent of one frame rotates the metering sprocket to decrement the counter dial to its next lower numbered setting. When substantially the entire length of the filmstrip is exposed and rewound into the cartridge, the camera is sent to a photofinisher who removes the filmstrip for processing and tosses away the camera.

In the "Quick Snap", the counter dial must be initialized to its "S" setting from a predetermined original setting, such as its "1" setting. Thus during factory prewinding of the filmstrip onto the take-up spool special care must be taken by the manufacturer to make sure that the counter dial is at its predetermined original setting before the prewinding operation is begun. Otherwise, the counter dial will provide an incorrect indication of the frame count.

SUMMARY OF THE INVENTION

The invention is believed to solve the above-described problem regarding initialization of a frame counter to a preliminary setting.

According to the invention there is provided apparatus for initializing a frame counter in a camera to a preliminary setting from a random setting, wherein (a) a take-up spool is rotated to prewind an unexposed filmstrip from a film cartridge onto said take-up spool, (b) an actuator is rotated in engagement with respective teeth of a frame counter to rotate said frame counter to successive settings including its preliminary setting, and (c) a sprocket connected to said actuator is rotated in engagement with the filmstrip during prewinding movement of the filmstrip to rotate the actuator to initialize said frame counter to its preliminary setting, and characterized in that:

said frame counter includes blocking means disposed within a predetermined space between two of said teeth for preventing said actuator from continuing to rotate the frame counter in the same direction to another setting after said actuator has rotated said frame counter to its preliminary setting, but permitting said actuator to continue to rotate in the same direction within said predetermined space as the flimstrip continues to be prewound onto said take-up spool, whereby said frame counter will remain initialized.

Since the apparatus for initializing the frame counter to its preliminary setting calls for the counter to be initialized from a random setting, the initializing operation is made relatively simple and is not subject to error as in the prior art example of the "Quick Snap".

THE CROSS-REFERENCED APPLICATION

As compared to the apparatus for initializing a frame counter according to the invention, the application cross-referenced above discloses a method of initializing a frame counter.

Specifically, in the cross-referenced application there is disclosed a method of initializing a frame counter in a disposable single-use camera to a preliminary setting from a random setting, wherein the camera is generally of the type including an actuator rotated in engagement with respective teeth of the counter during film movement between a film cartridge and a take-up spool to rotate the counter to successive settings including its preliminary setting, and wherein the steps of said method comprises:

rotating the take-up spool to factory prewind substantially the entire length of an unexposed filmstrip from the film cartridge onto the take-up spool;

rotating the actuator in engagement with successive teeth of the counter during prewinding movement of the unexposed filmstrip to rotate the counter to its preliminary setting from any other setting, to initialize the counter; and continuing to rotate the actuator in the same direction during continued prewinding movement of the unexposed filmstrip after the counter is initialized to its preliminary setting, but substantially within a space located between two of the teeth to prevent the actuator from engaging anyone of the teeth to rotate the counter out of its preliminary setting, whereby the counter will remain initialized.

DESCRIPTION OF THE PREFERRED EMBODIMENT

The invention is disclosed in connection with a 35 mm type camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
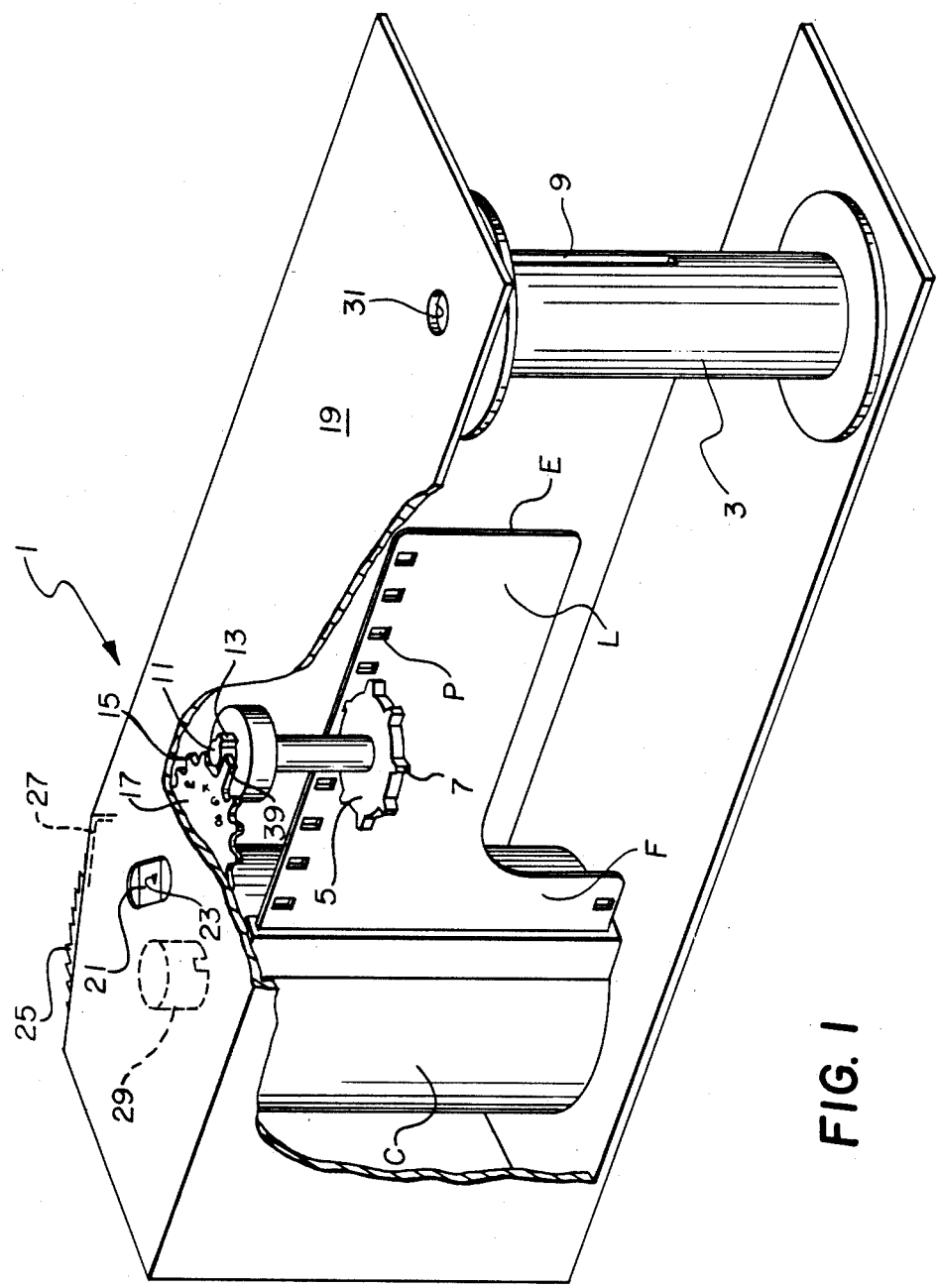
FIG. 1 is a perspective front view of the interior of a disposable single-use camera having apparatus for initializing a frame counter from a random setting in accordance with a preferred embodiment of the invention.

Referring now to the drawings and in particular to FIG. 1, there is shown certain elements of a disposable single-use camera 1 in which substantially the entire length of a unexposed filmstrip F is prewound from a conventional 24-exposure 35 mm film cartridge C onto a take-up spool or drum 3 before any exposures are taken. Then, after each exposure, the filmstrip F is rewound one frame at a time back into the cartridge C.

When the cartridge C is loaded in the camera 1, as shown in FIG. 1, a leader section L of the unexposed filmstrip F is placed over a conventional metering sprocket 5 to position one or more perforations P in the filmstrip in engagement with respective peripheral teeth 7 of the sprocket, and a forward end portion E of the film leader is inserted into a slot 9 in the take-up spool 3 to secure the film leader to the take-up spool. During rotation of the take-up spool 3 to prewind substantially the entire length of the filmstrip F from the cartridge C onto the spool, the metering sprocket 5 is rotated a single revolution each time an individual frame is wound onto the spool.

Figure 2:
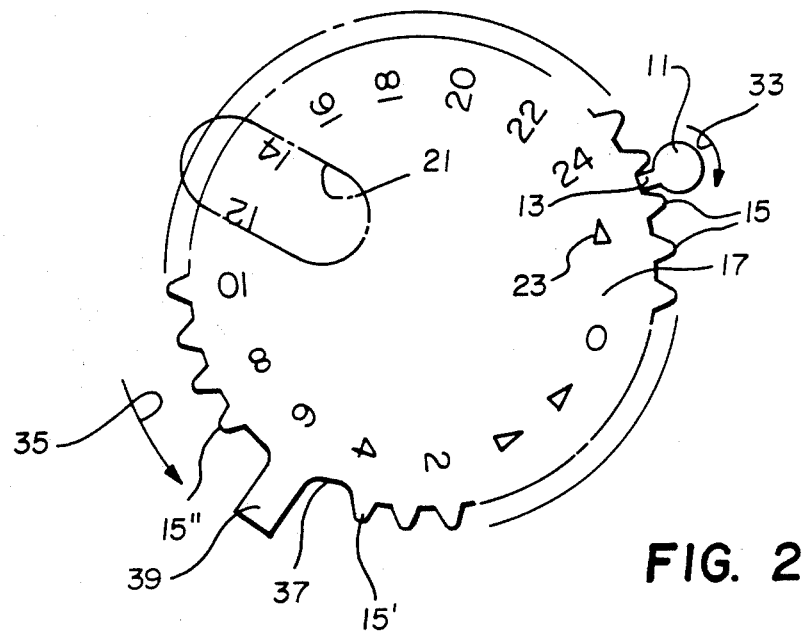
FIGS. 2-8 are plan top views of the frame counter and the initializing apparatus, depicting successive steps in the operation of the initializing apparatus.

An actuator 11 is coaxially fixed to the metering sprocket 5 and has a radial finger portion 13 for engaging respective peripheral teeth 15 of a counter disk 17 as the sprocket is rotated. The counter disk 17 is rotatably mounted beneath a top body portion 19 of the camera 1 and is partially visible through a window 21 in the top body portion. As shown in FIGS. 1 and 2, the counter disk 17 has 24 evenly spaced settings, every other one of which is designated by an even number from "2" to "24" imprinted on the disk at corresponding locations, and a preliminary setting designated by a triangular mark 23 imprinted on the disk at a predetermined location spaced from the "24" by the equivalent of two of the settings. The numbers "2" to "24" indicate every other one of the successive frames of the filmstrip F and the triangular mark 23 corresponds to a limited section of the filmstrip, following the twenty-fourth frame, which is exposed before taking the first picture. Each time the metering sprocket 5 is rotated a single revolution, the actuator 11 is similarly rotated to index the counter disk 17 to another setting, visible in the window 21.

To rewind the filmstrip F back into the cartridge C after each exposure, there is provided a conventional manual rewind knob 25 located beneath the top body portion 19 of the camera 1 and accessible at a slot 27 in the top body portion. As shown in FIG. 1, the knob 25 has a depending coaxially fixed shaft 29 which engages a film spool (not shown) of the cartridge C to rotate the spool.

INITIALIZATION OF THE CAMERA

At the manufacturer, the take-up spool 3 is engaged with a screwdriver or other implement, inserted through an access opening 31 in the top body portion 19 of the camera 1, to rotate the spool to factory prewind substantially the entire length of the unexposed filmstrip F from the cartridge C onto the spool. After the prewinding operation is completed, the access opening 31 is plugged.

The metering sprocket 5 is rotated in engagement with the unexposed filmstrip F during prewinding movement of the filmstrip to rotate the actuator 11 in a prewinding or clockwise direction indicated by the arrow 33 in FIG. 2. In turn, the radial finger portion 13 of the actuator 11 engages successive ones of the teeth 15 of the counter disk 17 to rotate the disk in a prewinding or counterclockwise direction indicated by the arrow 35 in FIG. 2. This indexes the counter disk 17 to the respective settings, visible in the window 21.

Figure 3:
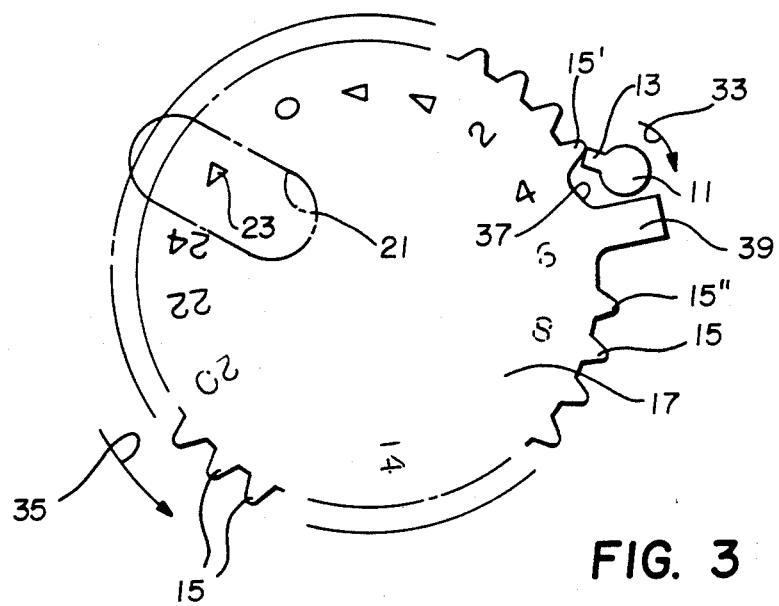

When the counter disk 17 is rotated sufficiently in the prewinding direction 35 to initialize it to the preliminary setting indicated by the mark 23, as shown in FIG. 3, a tooth 15' of the disk will have moved past the radial finger portion 13 of the actuator 11 and a space or gap 37 between that tooth and an elongate rise 39 of the disk will be located opposite the actuator.

Figure 4:
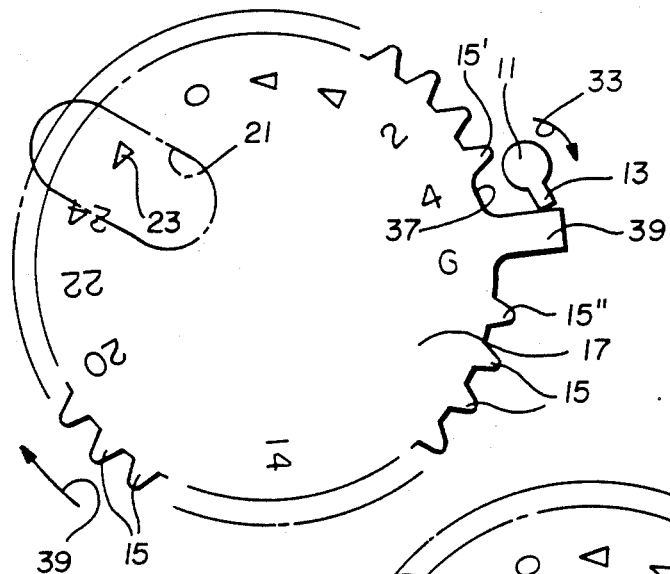
Figure 5:
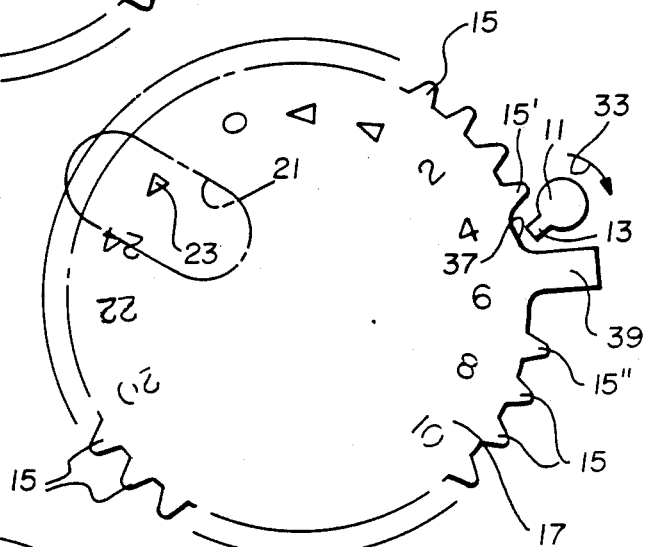

Continued rotation of the actuator 11 in the prewinding direction 33, as shown in FIGS. 4 and 5, during continued prewinding movement of the unexposed filmstrip F, after the counter disk 17 is initialized to its preliminary setting, substantially has no effect on the counter disk 17. That is, the counter disk 17 will not be rotated to another one of its settings. This is because the radial finger portion 13 of the actuator 11 cannnot surmount, i.e., swing over, the elongate rise 39 of the counter disk 17 to engage the next tooth 15" of the disk, nor can it engage the tooth 15' of the disk. Consequently, as long as the actuator 11 is rotated in the prewinding direction 33, it will merely rotate at the space 37 between the tooth 15' and the elongate rise 39.

When the actuator 11 is disposed at the angle shown in FIG. 4, its radial finger portion 13 bears against the elongate rise 39 of the counter disk 17 to slightly kick the disk in a rewinding direction indicated by the arrow 39 in FIG. 4. However, continued rotation of the actuator 11 in the prewinding direction 33 to the angle shown in FIG. 3, causes its radial finger portion 13 to bear against the tooth 15' of the counter disk 17 to slightly kick the disk in the prewinding direction 35. Thus, during rotation of the actuator 11 in the prewinding direction 33 at the space 37 between the tooth 15' and the elongate rise 39, the counter disk 17 will be moved slightly back and forth in the prewinding and rewinding directions 35 and 39.

Since the actuator 11 continues to rotate in the prewinding direction 33 at the space 37 between the tooth 15' and the elongate rise 39 of the counter disk 17, during continued prewinding movement of the unexposed filmstrip F, without it engaging either that tooth or the elongate rise to rotate the disk out of the preliminary setting, the disk can be initialized to the preliminary setting from any other setting, i.e., from a random setting, such as shown in FIG. 2. There is no need to position the counter disk 17 in a predetermined starting setting before the prewinding operation is begun as in prior art frame counters.

OPERATION OF THE CAMERA

Figure 6:
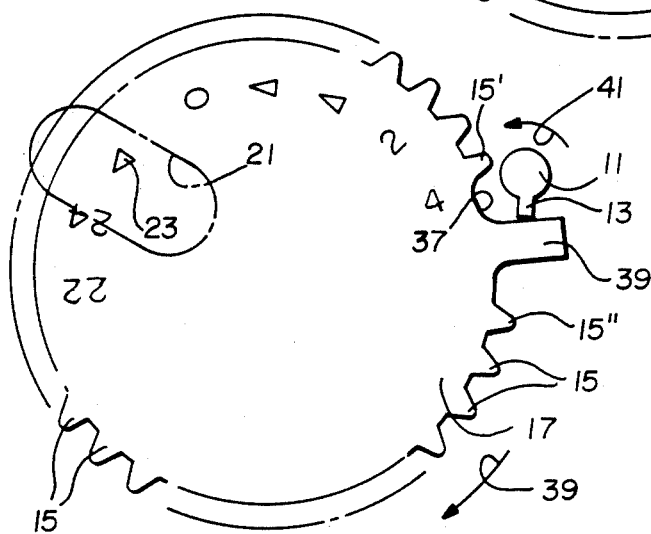
Figure 7:
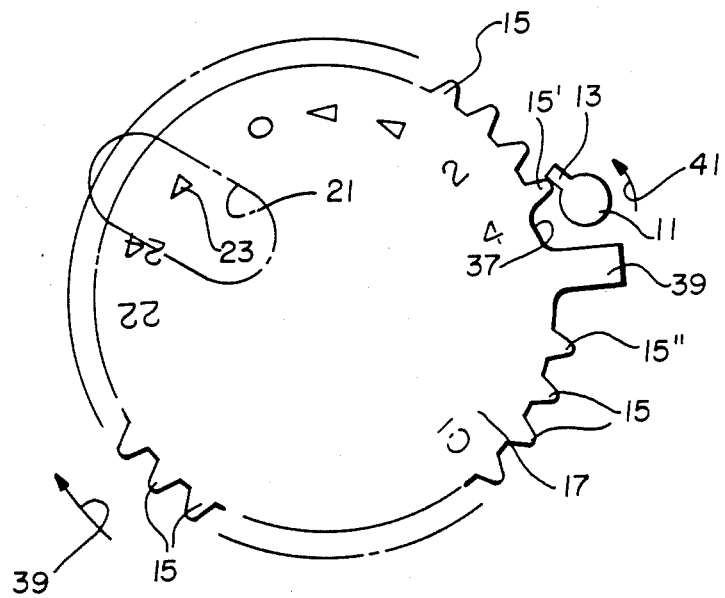
Figure 8:
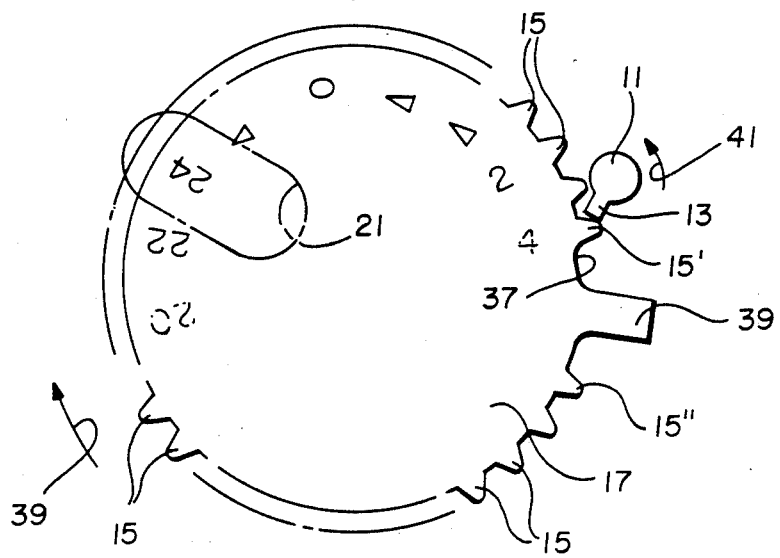
Figure 4:
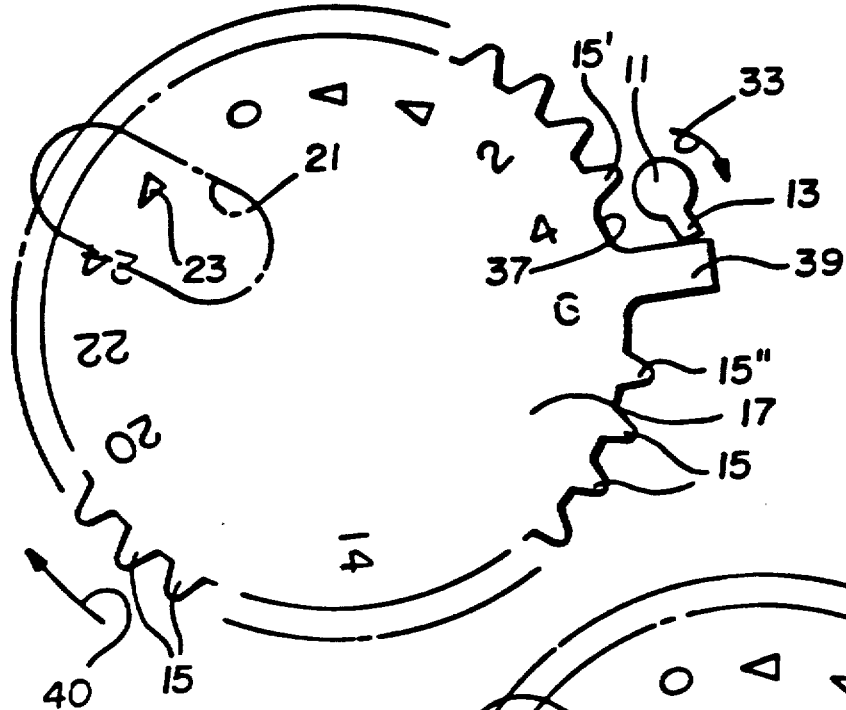
Figure 5:
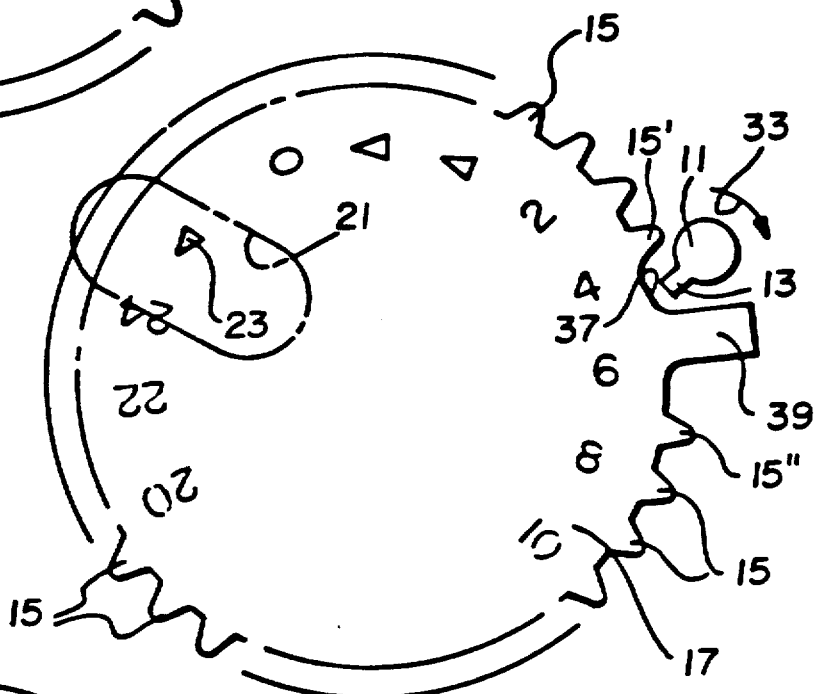
Figure 6:
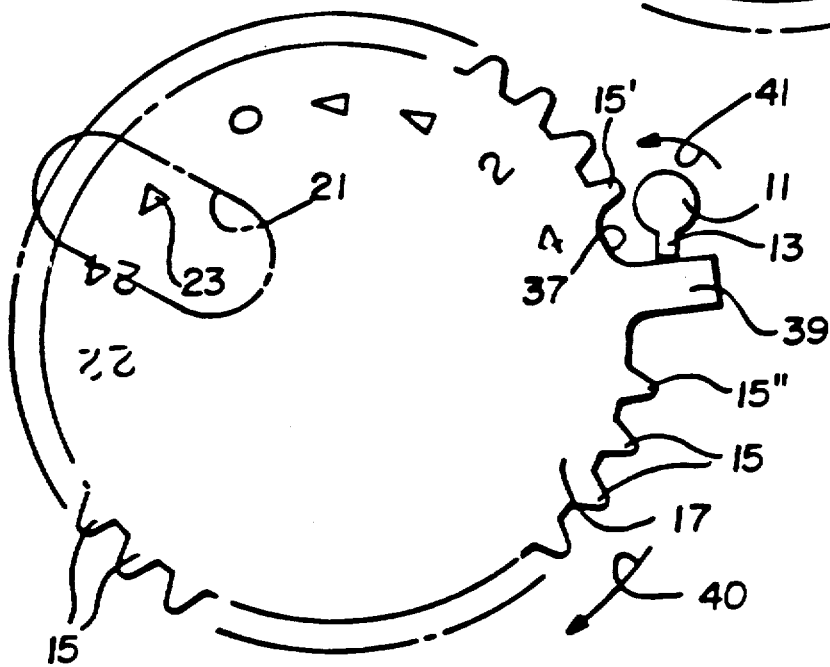
Figure 7:
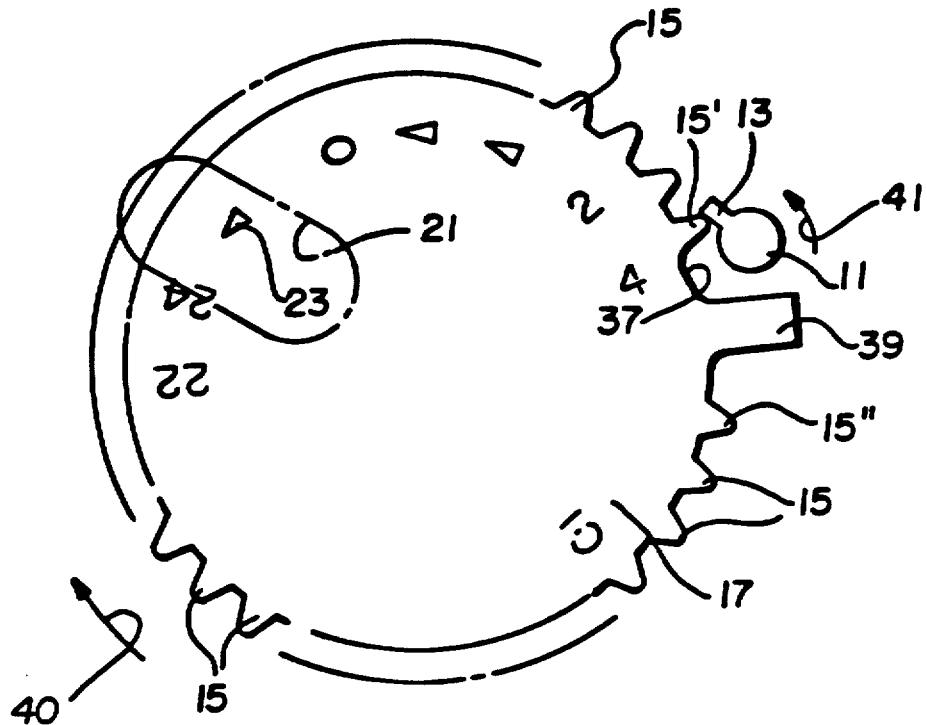
Figure 8:
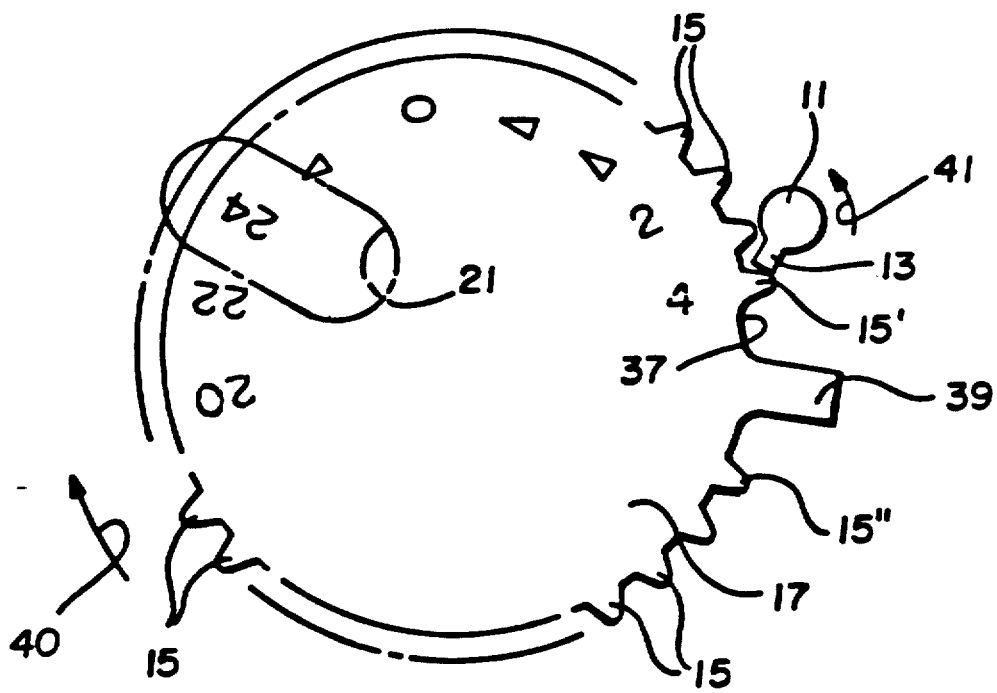

Before taking the first picture, two blank exposures are taken (with the lens covered) to index the counter disk 17 from its preliminary setting to its "24" setting and to ensure that the camera 1 is working properly. After each exposure, the manual rewind knob 25 must be rotated to rewind an individual frame into the cartridge C. When the actuator 11 is first rotated in a rewinding or counterclockwise direction indicated by the arrow 41 in FIG. 6, during initial rewinding movement of the filmstrip F, its radial finger portion 13 will bear against the elongate rise 39 of the counter disk 17 to slightly rotate the disk in the rewinding direction 39. Then, as shown in FIGS. 7 and 8, the radial finger portion 13 of the actuator 11 will engage the tooth 15' of the counter disk 17 to further rotate the disk in the rewinding direction 39 until the disk is indexed the equivalent of one frame.

When the filmstrip F is completely exposed and rewound back into the cartridge C, the counter disk 17 will be decremented to a "0" setting. Then, the camera 1 is sent to a photofinisher who removes the filmstrip for processing and tosses away the camera.

The invention has been described with reference to a preferred embodiment. However, it will be appreciated that variations and modifications can be effected within the ordinary skill in the art without departing from the scope of the invention.

We claim:

1. Apparatus for initializing a frame counter in a camera to a preliminary setting from a random setting, wherein (a) a take-up spool is rotated to prewind an unexposed filmstrip from a film cartridge onto said take-up spool, (b) an actuator is rotated in engagement with respective teeth of a frame counter to rotate said frame counter to successive settings including its preliminary setting, and (c) a sprocket connected to said actuator is rotated in engagement with the filmstrip during prewinding movement of the filmstrip to rotate the actuator to initialize said frame counter to its preliminary setting, and characterized in that:

said frame counter includes blocking means disposed within a predetermined space between two of said teeth for preventing said actuator from continuing to rotate the frame counter in the same direction to another setting after said actuator has rotated said frame counter to its preliminary setting, but permitting said actuator to continue to rotate in the same direction within said predetermined space as the filmstrip continues to be prewound onto said take-up spool, whereby said frame counter will remain initialized.

2. Apparatus as recited in claim 1, wherein said blocking means is configured with respect to said teeth of the frame counter to prevent said actuator from engaging the blocking means to rotate said frame counter in the manner the actuator engages the teeth to rotate the frame counter.

3. Apparatus as recited in claim 2, wherein said blocking means projects farther away from said frame counter than does said teeth of the frame counter to prevent said actuator from rotating over the blocking means to the next tooth.

* * * * *

UNITED STATES PATENT OFFICE
CERTIFICATE OF CORRECTION

PATENT NO. : 4,755,842  
DATED : July 5, 1988  
INVENTOR(S) : D. Barclay and L. Oldfield Page 1 of 3

It is certified that error appears in the above-identified patent and that said Letters Patent is hereby corrected as shown below:

Column 4, Line 54    "39" before "in" should be replaced with "40".

Column 4, Line 63    "39" after "and" should be replaced with "40".

Column 5, Line 21    "39" after "direction" should be replaced with "40".

Column 5, Line 25    "39" after "direction" should be replaced with "40".

The sheets of drawing consisting of Figs. 4, 5, 6, 7 and 8, should be deleted to appear as shown on the attached sheets.

Signed and Sealed this

Sixteenth Day of May, 1989

Attest:

DONALD J. QUIGG

Attesting Officer

Commissioner of Patents and Trademarks